United States Patent [19]

Von Bonin et al.

[11] 3,850,650
[45] Nov. 26, 1974

[54] PRODUCTION OF SILICATE FOAMS

[75] Inventors: Wulf Von Bonin; Ulrich Nehen, both of Leverkusen; Ulrich Von Gizycki, Cologne, all of Germany

[73] Assignee: Bayer Aktiengesellschaft, Leverkusen, Germany

[22] Filed: Dec. 26, 1972

[21] Appl. No.: 318,068

[30] Foreign Application Priority Data
Mar. 25, 1972 Germany............................ 2214609
Dec. 31, 1971 Germany............................ 2165912

[52] U.S. Cl................................... 106/75, 106/84
[51] Int. Cl............................................ C04b 35/16
[58] Field of Search.................... 106/75, 84, 38.35

[56] References Cited
UNITED STATES PATENTS
| | | | |
|---|---|---|---|
| 3,095,312 | 6/1963 | Holmes................................ | 106/75 |
| 3,661,602 | 5/1972 | Gerow.................................. | 106/75 |
| 3,678,144 | 7/1972 | Shoup................................ | 106/38.35 |
| 3,715,224 | 2/1973 | Campbell............................. | 106/84 |
| 3,725,095 | 4/1973 | Weidman et al...................... | 106/75 |
| 3,741,898 | 6/1973 | Mallow et al........................ | 106/75 |

*Primary Examiner*—J. Poer
*Attorney, Agent, or Firm*—Burgess, Dinklage & Sprung

[57] ABSTRACT

The present invention relates to a process for the production of a foam having a silicate skeleton which comprises mixing in aqueous solution a water soluble silicate, a hardener which liberates acid in water and a foaming agent. It is preferred to use as silicate solution a sodium waterglass solution, as hardeners those liberating $CO_2$, carboxylic acids, sulfonic acids or mineral acids and as foaming agents optionally halogen-substituted alkanes and alkenes, and dialkyl ethers.

8 Claims, No Drawings

PRODUCTION OF SILICATE FOAMS

This invention relates to a process for the production of foams having a skeleton consisting essentially of silicates.

French Patent Specification No. 2,055,341, for example, describes the production of a foam which comprises heating aqueous silicate solutions optionally containing thickeners into a foam with air and then allowing this foam to harden.

Processes of this kind have the disadvantage that the foamy material retains or even reduces its volume during hardening. Thus, it is extremely difficult uniformly to fill complicated molds, for example molds having undercuts, with foam or to carry out mold foaming operations in which the foam is required to exert a certain pressure upon the walls of the mold, for example in order to guarantee a better bond with the wall material or penetration therethrough.

It is accordingly an object of the invention to provide a simple process for producing silicate foams which can easily be shaped in molds, conforming fully to the mold contours. This process is distinguished by the fact that a foaming agent and an acid-yielding hardener are added to an aqueous silicate solution optionally containing inorganic and/or organic additives.

Surprisingly, we have found that aqueous silicate solutions can be effectively foamed and that expansion of the silicate formed can also be obtained simultaneously with the hardening process by mixing the silicate solution together with an expanding or foaming agent and a hardener and allowing the resulting mixture to foam and harden, optionally in molds. Particularly suitable hardeners are substances which liberate carbon dioxide, carboxylic acids, sulfonic acids or mineral acids in aqueous media. It is preferred to use acid-liberating hardeners which, when added in the form of a 10 percent mixture to a soda waterglass solution containing 0.5 percent by weight of Na—$C_{14}$-alkyl sulfonate with a density of approximately 1.36 ($Na_2O$-content approximately 8.6 percent by weight, $SiO_2$-content approximately 25.4 percent by weight), cause this solution to gel in less than 15 minutes at 25°C.

Aqueous silicate solutions suitable for use in the process according to the invention include solutions of silicates in water or aqueous media which can have the character both of true solutions and also of colloidal solutions, for example ammonium silicates or metal silicates. Alkali metal silicate solutions, for example sodium or potassium silicate solutions, are preferably used. The so-called waterglass solutions which have long been commercially available represent a particularly suitable starting material. In this case, the dissolved silicate does not necessarily have to correspond to the formula $$Na_2O \cdot 3-4 SiO_2$$

which is the basis for example for waterglass. The ratios of alkali metal oxide to $SiO_2$ can vary for example from 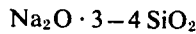 polysilicates differing in their degree of polymerization, in which the ratio of alkali metal oxide to $SiO_2$ is less than 1 : 1, for example 0.1 : 1. However, it is essential that the silicate solution should be free-flowing. The upper limit to the concentration of these solutions, amounting to about 60 percent, is imposed by the necessary fluidity of the solutions, although it would even be possible to process more highly concentrated solutions, for example in kneaders at elevated temperature. At its lower end, the concentration range is limited by the fact that solutions having a solids content of less than about 5 percent generally only give gels of unsatisfactory strength. It is preferred to use silicate solutions having a solids content of about 10 to 50 percent by weight.

In the context of the invention, inorganic or organic additives are additives which, as gases, liquids and solids, can be either soluble or insoluble in the silicate solution providing they are compatible, i.e., providing they do not cause the silicate solution to be precipitated under the mixing conditions.

These additives can have the character of fillers, diluents or special auxiliaries.

Suitable fillers are solid inorganic or organic substances, for example in the form of powder, granulate, wire, fibers, dumb bells, crystallites, spirals, rods, beads, hollow beads, foam particles, webs, pieces of woven fabric, knitted fabric, tapes, pieces of film, etc., for example of dolomite, chalk, alumina, asbestos, basic silicas, sand, talcum, magnesium oxide, zinc oxide, calcium oxide, iron oxide, aluminum oxide and oxide hydrates, alkali silicates, zeolites, mixed silicates, calcium silicates, calcium sulfates, aluminosilicates, cements, basalt wool or powder glass fibers, C-fibers, graphite, carbon black, Mg-, Al-, Fe-, Cu-, Ag-powder, molybdenum sulfide, steel wool, bronze or copper cloth, silicon powder, expanded clay particles, hollow glass beads, glass powder, perlite, vermiculite, lava and pumice particles, wood chips, sawdust, cork, cotton, straw, popcorn, coke, particles of filled or unfilled, foamed or unfoamed, stretched or unstretched organic polymers. Of the whole number of suitable organic polymers, the following are mentioned by way of example and can be present for example in the form of powder, granulate, foam particles, beads, hollow beads, foamable or unfoamed particles, in the form of fibers, tapes, woven fabrics, webs, etc.: polystyrene, polyethylene, polypropylene, polyacrylonitrile, polybutadiene, polyisoprene, polytetrafluoroethylene, aliphatic and aromatic polyesters, melamine-urea or phenol resins, polyacetal resins, polyepoxides, polyhydantoins, polyureas, polyethers, polyurethanes, polyimides, polyamides, polysulfones, polycarbonates, and, of course, any copolymers providing they are compatible with the silicate solutions.

Fillers that should be particularly mentioned are asbestos, magnesium oxide, dolomite, chalk, sand, talcum, kaolin, glass in foamed or fibrous form, carbon, polystyrene, polyvinyl chloride and polyethylene in foamed or unfoamed form, terephthalic acid polyester, polyacrylonitrile, polyamides, polypropylene, polyurethanes in the form of fibers, webs, woven fabrics or foams.

In one particular embodiment of the process according to the invention, it is also possible to use the preliminary stages of the solid polymers, providing they are compatible with the silicate solutions, in solid or liquid form as additives or fillers, and to polymerize or harden them through corresponding reactions during or after the hardening process. Styrene, mixtures of styrene and unsaturated, for example maleic acid polyester, diallyl phthalate or methyl methacrylate or solutions of monomers in polymers, are examples of substances suitable for this purpose.

Other substances suitable for this purpose include for example melamine, urea, phenols or other substances, for example amides, which, together with other reactive components which, like formaldehyde or certain isocyanates, are compatible with the silicate solutions and which can also be added, induce a hardening process or polymerization, polycondensation or polyaddition process optionally taking place in addition to hardening of the silicate solution.

Compatible, gaseous additives to the silicate solutions can also be regarded in the context of the invention as more or less voluminous fillers. Gases such as these which should be inert with respect to the silicate solution and which include air, oxygen, nitrogen, $SF_6$, hydrogen, noble gases, methane and $CF_4$, preferably air, can be added to the silicate solutions optionally in admixture with the other additives either in the absence of pressure or under excess pressure. In this case, it is advantageous additionally to use foam-forming and foam-stabilising auxiliaries of the kind described below.

In this way, it is possible in accordance with the present invention to obtain foamed moldings, the gases and also the other fillers, diluents or other auxiliaries, i.e. the additives, being added in one or more operations either wholly or in part before, during or immediately after addition of the additives which induce the hardening reaction.

In general, the additives designated as fillers are added in such quantities that the reaction mixtures have a dissolved silicate content of greater than about 50 percent by weight, preferably between about 10 and 50 percent by weight. The amount of filler, when used, will generally not exceed about 95 percent and preferably about 75 percent by weight of the reaction mixture.

Diluents represent further additives. The diluents can be aqueous or non-aqueous in character.

As well as the use of polymer solutions, for example polystyrene, polyesters, rubber in petrol, benzene or chloroform, or of phenol-, urea- or melamine-formaldehyde precondensates in water, the use of polymer dispersions as diluents represents a borderline case so far as the fillers are concerned. Suitable polymer dispersions are those which can be obtained by conventional processes but which must be compatible with the silicate solutions in two respects: firstly, they should not precipitate the silicate solution, secondly they should not themselves be precipitated by the silicate solution. This requirement is satisfied by a number of commmercially available or conventionally obtainable dispersions of polyurethanes, polyvinylacetate, polystyrene, polybutadiene, polyacrylates, polyacrylonitrile, polyethylene, polyvinyl chloride or their copolymers, although it should be checked from case to case in simple preliminary tests as it is often governed by the emulsifier used.

These diluents can be used in such quantities that the resulting mixtures have a silicate content in excess of about 5 percent by weight and preferably within the range of about 10 to 50 percent by weight.

It is also possible to work in the same ratio with other diluents, for example with aqueous formaldehyde solutions, or diluents which are insoluble in the silicate solution and which can also be used as diluents for the hardeners subsequently added, again the only requirement being their compatibility. Examples of diluents such as these include aliphatic and aromatic hydrocarbons such as benzene, toluene, xylene, styrene, petrols, paraffin oil, paraffin wax, fatty acid esters, diethyl carbonate, glycol diacetate, diethyl phthalate, silicones, trioctyl- or triethyl phosphate, ethylbenzoate, butyl acetate, orthoformic acid ethyl ester, oleic acid glycerides, chlorinated hydrocarbons such as halogen methanes, petroleum cuts and bitumen.

Diluents of this kind also include the compounds added as foaming agents which give rise to the formation of gas bubbles. Examples of suitable foaming agents include alkanes, halogen-substituted alkanes and alkenes or dialkyl ethers. Particularly suitable foaming agents are volatile substances having boiling points in the range of about −25°C to +80°C, preferably those having boiling points of about −15°C to +45°C which are preferably insoluble in the silicate solution. Examples of substances such as these include saturated or unsaturated hydrocarbons having 4 to 5 carbon atoms such as isobutylene, butadiene, isoprene, butane, pentane, isopentane, petroleum ether, halogenated saturated or unsaturated hydrocarbons such as chloromethane, methylene chloride, fluorotrichloromethane, difluorodichloromethane, trifluorochloromethane, chloroethane, vinyl chloride and vinylidene chloride. Trichlorofluoromethane, vinyl chloride and $C_5$-hydrocarbons, for example, pentane and pentene, have proved to be the most suitable.

The hardeners are members of known classes of substances. It is also possible to use mixtures of different hardeners in order to obtain variable thickening and hardening times. Mixtures of the hardeners with other additives which solidify alkali silicate solutions can also be used, such as for example mixtures with pyrocarbonic acid esters or carboxylic acid-carbonic acid ester anhydrides or other carboxylic acid esters with a hardening effect, or additives of the kind described in Belgian Patent Specification No. 753,761.

According to this invention, it is possible in principle to use as hardeners any substances which induce an acid reaction in aqueous medium, for example by liberation of $CO_2$, carboxylic acids, phosphonic acids, sulfonic acids or mineral acids.

Preferred hardeners are compounds or mixtures of compounds which, added in the form of a 10 percent by weight mixture to a soda waterglass solution containing 0.5 percent by weight of Na—$C_{14}$-alkyl sulfonate with a density of approximately 1.36 ($Na_2O$-content approximately 8.6 percent by weight, $SiO_2$-content approximately 25.4 percent by weight), cause this solution to gel in less than 15 minutes at a temperature of 25°C. This test is easy to carry out and is described in the experimental section.

Particularly suitable hardeners are, particularly, hardeners or mixtures of hardeners which are liquid at temperatures below about 50°C, especially those which are still liquid below about 30°C, because hardeners of this kind are particularly easy to handle on a commercial scale.

Accordingly, it is preferred to use as hardeners aliphatic, cyclic, araliphatic or aromatic compounds derived for example from the following classes of compounds: carboxylic acids and carboxylic acid anhydrides such as methyl hexahydrophthalic acid anhydride, isopropenyl succinic acid anhydride, octane carboxylic acid anhydride, oleic acid-acetic acid mixed anhydride, benzoic acid-acetic acid mixed anhydride, carboxylic acid halides, preferably carboxylic acid chlorides of mono- and polycarboxylic acids such as versatic acid chloride, oleic acid chloride, benzoic acid chloride, 3-methyl benzoyl chloride, 3-methoxy benzoyl chloride, higher alkyl or alkoxy benzoyl chlorides, diphenyl methane dicarboxylic acid chlorides, s and asphthalyl chloride, isophthalyl chloride, terephthalyl chloride, chlorides of benzene tri- and tetra-carboxylic acids, also alkyl-, alkoxy- and halogen-substitution products of benzene dicarboxylic acid chlorides, for example chloroisophthalyl chlorides, aromatic and aliphatic compounds with active, hydrolyzable halogen such as alkyl chloride, benzyl chloride, benzal chloride, benzotrichloride, chloroformic esters such as for example, the chloroformic esters of ethanol, butanol, and octanol, of ethylene glycol, butane diol, glycerine, trimethylol propane, pentaerythritol, of fatty alcohols, of cyclohexanol, phenol, pyrocatechol, hydroxyethoxy phenol, hydroxypropoxy phenol or hydroquinone, of dihydroxyphenyl methane or dimethyl dihydroxyphenyl methane and their alkoxylation products, of cresol or xylenol and their alkoxylation products, of alkyl phenols, for example of isopropyl phenol; sulfates, for example dimethyl sulfate, diethyl sulfate, dipropyl sulfate, sulfonic acid halides, especially sulfochlorides such as benzene sulfochloride, otosylchloride, 3,4-dichlorobenzene sulfochloride, isopropyl or isooctyl benzene sulfochloride. The following are also suitable: sulfonic acid esters, phosphoric acid esters, isocyanates such as cyclohexyl isocyanate hexamethylene diisocyanate, isophorone diisocyanate, phenyl isocyanate hexamethylene diisocyanates, diphenyl methane diisocyanate. Compounds with readily liberated halogen, such as imide chlorides, carbamic acid chlorides, for example N-diethyl carbamic acid chloride, isocyanide dichlorides, for example phenyl isocyanide dichloride, dichloroethyl isocyanide dichloride, pentachloroethyl isocyanide dichloride or alkoxyisocyanide dichloride on the basis of monofunctional or polyfunctional alcohols, for example ethylene glycol or propylene glycol, of the kind which can be obtained, for example, by reacting these alcohols with ClO-CONCCl$_2$, isocyanide dichlorides, for example phenyl isocyanide dichloride, chloropyrimidines, halogen triazines as cyanurchloride or such as 2-(methoxyethoxy)-4,6-dichloro-s-triazine and 2-isopropoxy-4,6-dichloro-s-triazine.

Any particularly suitable hardener should induce hardening as quickly as possible, but should not prevent optimum foaming of the reaction mixture through premature hardening. The hardener and its hydrolysis products should be as odor-free as possible and substantially nonvolatile in order to prevent pollution. Also, the hardener should contain as many chemical groups which become chemically active for hardening as possible per unit weight, i.e. should have a low equivalent weight (based on releasable acids).

In order to ensure ready addition, it is also best for the hardeners to be liquid at room temperature. In order to obtain optically neutral, i.e. uncolored, foams, the hardener should not only be colorless, but its hydrolysis products should also be colorless in this respect and should not give rise to any discoloration.

Hardeners such as these are, for example, compounds corresponding to the general formula

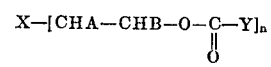

in which
Y is a halogen atom,
A and B are a methyl group or a hydrogen atom,
$n$ is an integer between 2 and about 20, and
X is an oxygen atom or a radical of a polyol having n hydroxy groups or of a polycarboxylic acid having n carboxy groups.

It is preferred to use hardeners in which Y represents chlorine and $n = 2$ to 6. In particular, it is preferred to use hardeners of the kind which have an equivalent weight of less than about 100 (based on the possible acid equivalents formed).

In order to illustrate the meaning of equivalent weight in the context of the invention, it is pointed out that this value is determined not only from the acids $CO_2$ and HCl emanating for example from the group (—CHA—CHB—O—COY), but also from any other structural groups still present in the hardener molecule from which further acid equivalents can be liberated under the reaction conditions, i.e. in the alkaline aqueous medium, for example ester groups, acid halides, sulfo halides, carbonic acid halides, isocyanide dihalides, activated halogen or activated acid hydrogen groups, dicarbonates and anhydrides.

These hardeners are also compounds which are known in principle. One convenient method of preparation is to alkoxylate the parent acids or alcoholic compounds and then to phosgenate the resulting intermediate products. The ethoxylated or propoxylated intermediate products are preferably phosgenated. The substances used as hardeners are prepared by methods known per se (cf. for example Houben-Weyl, Vol VIII, 103; U.S. Pat. No. 2,370,568; Vieweg-Höchtlen, Kunststoff-Handbuch 1966, Vol. 7, 60).

The parent compounds can in turn be aromatic, araliphatic, heterocyclic, cyclic or, preferably, aliphatic in character. They can be polymeric in character, although they are preferably oligomeric or monomeric. As well as the OH groups essential for conversion into the hardener compound, whether alcoholic or carboxylic acid OH groups, the compounds on which the hardeners are based can contain in addition to other groups which are able to induce an acid reaction, for example ester groups, acid halide, sulfo halide, carbamic acid halide, isocyanide dihalide, otherwise activated halogen, otherwise activated acid H, dicarbonate, anhydride, etc., other structural groups which are less reactive to hydrolysis under the reaction conditions, for example amide or amine groups, halogen substituents, nitriles ether or ketone groups, nitro groups, urethane groups and epoxide groups.

The most simple type of parent compound is water; the hardener to be derived therefrom would be diethylene glycol-bis-chloroformic acid ester or dipropylene glycol-bis-chloroformic acid ester. Triethylene glycol-bis-chloroformic acid ester, for example, would be derived from ethylene glycol, as similarly would tripropylene glycol-bis-chloroformic acid ester from propylene glycol, while tetraethylene glycol-bis-chloroformic acid ester would be similarly derived from diethylene glycol.

Of the wide variety of suitable parent compounds, hardeners which, formally, can be similarly derived in particular from the following acids or alcohols, for example by ethoxylation (propxylation) and phosgenation, are of interest to the process according to the invention (not all the OH-groups present in these alcohols or acids need necessarily be reacted):

Monohydric and polyhydric alcohols, alcohols preferably having up to 10 carbon atoms containing ether, ester or amine groups or hetero atoms, such as chloro or trichloroethanol, ethylene glycol, propylene glycol, butane diol, butene diol, hexane diol, diethylene glycol, triethylene glycol, glycerin, hexane triol, trimethylol propane, pentaerythritol, sorbitol, hexitol, dextrose, saccharose, addition products of 0.5 to 10 moles, preferably 0.4 to 4 moles, of ethylene oxide or propylene oxide with alcohols of this kind, partial esters of these alcohols with monobasic and polybasic acids, for example glycol mono(tri)chloroacetate, glycerin carbonate, maleic acid semi esters of 1 of glycerin and 1 mole of maleic acid, oligomers of hydroxy ethyl acrylate or hydroxy propyl methacrylate or alcohols containing carboxyl groups such as citric acid, lactic acid, tartaric acids, malic acid and salicyclic acid.

Corresponding to the alcohols, carboxylic acids are useful as OH-group-containing compnds on which the hardeners are based. These carboxylic acids can be monobasic and polybasic, saturated or unsaturated. The following are mentioned as examples: tri- or di- or mono-chloroacetic acid, oxalic acid, succinic acid, maleic acid, benzene di-, -tri- and -tetra-carboxylic acids and their partial esters or alkoxylation products or ethanolamides or imides.

Of the number of different types of hardeners which can be obtained on the basis of the compounds mentioned by way of example, the following representatives are emphasized as preferred:

The bis-chloroformic esters of diethylene glycol, of dipropylene glycol, triethylene glycol, tripropylene glycol, tetraethylene glycol and of the mixed oligomers of ethylene oxide and propylene oxide, for example of the trimer of 2 moles of ethylene oxide and 1 mole of propylene oxide or 1 mole of ethylene oxide and 2 moles of propylene oxide. In this connection, reference is also made to the chloroformic esters which can be obtained by phosgenating statistical addition products of 0.5 to 8 moles of ethylene oxide and/or propylene oxide with glycerin, trimethylol ethane, trimethylol propane, pentaerythritol or sorbitol.

Chloroformic acid esters of the alkoxylation products are prepared for example by introducing an excess of phosgene into a solvent, such as methylene chloride, and introducing the compound to be phosgenated at a temperatuare around 0°C. The reaction is allowed to run to conclusion by stirring at temperatures in the ranges of about 0°C to approximately 40°C, and the chloroformic ester is isolated by removing the solvent, the hydrochloric acid formed and the excess phosgene by distillation or by passing the reaction mixture through a thin-layer evaporator, for example at 12 mmHg/50°C.

Acid chlorides, chloroformic esters, anhydrides and isocyanide dichlorides are particularly suitable for the process according to the invention, for example benzoyl chloride, halogenated phthalyl and isophthalyl chlorides, 3,4-dichlorobenzoyl sulfonic acid chloride, the bis-chloroformic esters of butane diol, dipropylene glycol, tri- and tetraethylene glycol or the reaction products of chlorocarbonyl isocyanide dichloride with ethylene glycol or propylene glycol.

The substances mentioned as hardeners can be used either individually or in admixture with one another or with other substances which gel silicate solutions, for example with diethyl pyrocarbonate, with isophthalic acid-bis-carbonic acid monoethyl ester anhydride, diethyl oxalate, esters of (mono-, di-, tri-) chloroacetic acid, 2-oxo-4-methyl-1,3-dioxolane, vinyl acetate, dimethyl carbonate, dimethyl maleate and glycol diacetate.

It is also possible to use mixtures of substances in which at least one component by definition gives a gelling time of longer than 15 minutes, but which overall produce gelling times of less than 15 minutes.

It is appropriate to use hardener mixtures particularly in cases where it is desired to control the setting times by using differently reactive hardeners.

It is also possible to use combinations of the liquid hardeners, used in the process according to the invention, with solid substances (as solutions or suspensions) which are able to harden silicate solutions, for example cyanuric chloride, phthalic acid or pyromellitic acid anhydride and magnesium phosphate or $Na_2SiF_6$.

The hardeners or hardener mixtures should be used in quantities of about 0.01 to 60 percent by weight and preferably in quantities of about 0.5 to 30 percent by weight, based on the reaction mixture.

It is also readily possible to add the hardener substances on their own, i.e. without expanding agents, except that in this case products which are solid to porous compositions rather than foams are obtained.

Production of the foams in accordance with the invention is basically carried out by mixing the described reaction components together either in one stage or in several stages in a batch mixer or continuous mixer and allowing the resulting mixture to foam and harden generally outside the mixer in molds or on suitable supports. In this case, the reaction temperatures, which are in the range from 0°C to 100°C and preferably about 15° to 60°C, can be obtained either by preheating one or more reaction components before the mixing process or by heating the mixer itself or by heating the reaction mixture prepared after mixing. Combinations of these or other procedures are of course also suitable for adjusting the reaction temperature. In many cases, enough heat is generated during the reaction itself so that, after the beginning of the reaction and of foaming, the original reaction temperature can quite easily rise by 100°C. However, this heat of reaction does not in any way affect the measure taken in accordance with the invention, namely that foaming should be carried out at temperatures of about 0° to 100°C, because this measure relates to the induction of foaming.

For any given composition, the properties of the resulting foams, for example their density when moist, is governed to some extent by the details of the mixing proess, i.e. by the shape and rotational speed of the stirrer, by the shape of the mixing chamber and by the reaction temperature selected to induce foaming. Although density can vary from about 0.05 to 0.95, densities of about 0.15 to 0.9 are generally obtained in the moist, fresh foam. The dried foams can have closed cells although, as a rule, the dried foams are largely open-pored and have densities of about 0.02 to 0.9.

It is of course also possible initially to convert the silicate solutions optionally already containing inorganic or organic additives into a more highly viscous state using a deficit of hardener, i.e. with a quantity of hardener which, although promoting condensation of the silicates or silica into units of higher molecular weight, does not induce their final crosslinking, i.e. hardening, and thereafter to complete hardening as required, optionally by adding more hardener, after storage or any application-oriented manipulations.

The behavior of the reaction mixtures provides the process according to the invention with numerous potential applications and, hence, fields of application of which a few are outlined by way of example in the following description. According to the particular applications envisaged, it can be decided whether to leave the water present in the hardened mixtures in the foam as a desirable constituent or whether to protect the foam against the escape of water by suitably coating or lining it, or to remove all or some of the water by suitable drying techniques, for example heating cabinet, hot air, IR-heating, ultra-sonic heating or high-frequency heating.

The reaction mixture containing foaming agent can be coated for example on to warm, cold or even IR- or HF-irradiated substrates or, after passing from the mixer, can be sprayed with compressed air or even by an airless process on to these substrates where it can foam andd harden to form a filling or insulating or fire-preventing coating. The foaming reaction mixture can also be pressed, cast or injected into cold or heated molds and left to harden in these molds, whether in the form of relief molds or solid or hollow molds, optionally by centrifugal casting either at room temperature or at temperatures of up to 200°C, optionally under pressure. It is possible in this respect to use strengthening elements, whether in the form of inorganic or organic or metal wires, fibers, webs, foams, woven fabrics, skeletons, etc. This can be done for example by the fiber mat impregnating process or by processes in which reaction mixtures and strengthening fibers are sprayed together on to the mold, for example by means of a spray machine. The moldings obtained in this way can be used as structural elements, for example in the form of optionally foamed sandwich moldings produced directly or subsequently by lamination with metal, glass, plastics, etc., in which case the favorable burning properties either in moist or in dry form, are advantageous. However, they can also be used as hollow bodies, for example as containers for goods optionally to be kept moist or cool, as filler materials or exchangers, as catalyst or active-substance supports, as decorative elements, furniture components or as fillings for hollow spaces. They can also be used as high-stress lubricants and coolants or as carriers therefor, for example in the extrusion of metals. They can also be used in the field of model and mold construction and in the production of molds for casting metals.

In one preferred procedure, foaming is carried out simultaneously with hardening, for example by preparing the reaction mixture in the mixing chamber and simultaneously adding the readily volatile foaming agent, for example dichlorodifluoromethane, trichlorofluoromethane, butane, isobutylene or vinyl chloride, so that, providing the temperature of the mixture is suitably selected, the reaction mixture issuing from the mixing chamber simultaneously foams through evaporation of the expanding agent and hardens under the effect of the hardener, the resulting foam, which optionally may also contain emulsifiers and foam stabilizers and other auxiliaries, being fixed. In addition, the initially still thinly liquid reaction mixture can be expanded into a foam by introducing gases such as air, methane, $CF_4$ and noble gases, optionally under pressure, bringing the foam thus obtained into the required foam and allowing it to harden in this form. It is also possible initially to convert the silicate solution optionally containing foam stabilizers such as wetting agents, foam formers, emulsifiers and, optionally, other organic or inorganic fillers or diluents, into a foam by treating it with the aforementioned gases, subsequently mixing this foam with the hardener used as precipitant in a mixer, and thereafter foaming and hardening.

The foams obtained in this way can be used in dried or moist form, optionally after a consolidation or tempering process, optionally under pressure, as insulating materials, space fillings, packaging materials, drainage media and as building materials of high resistance to solvents coupled with favorable flameproof properties. They can also be used as lightweight building materials in the form of sandwich elements, for example with metal surface layers, in house, motor vehicle and aircraft construction.

The reaction mixtures can also be dispersed in droplet form, for example in gasoline, or can be made to foam and harden during a free fall or the like, resulting in the formation of foam beads.

It is also possible to incorporate in the foaming reaction mixtures while they are still free-flowing organic or inorganic particles which are either capable of foaming or which have already been foamed, for example expanded clay, vermiculite, expanded glass, wood, popcorn, cork, hollow beads of plastics, for example vinyl chloride polymers, polyethylene, styrene polymers or foam particles thereof or even, for example, polysulfone-, polyepoxide-, polyurethane-, urea-formaldehyde-, phenol-formaldehyde-, polyimide-polymers, or to allow the reaction mixtures to foam through packings of these particles and, in this way, to produce insulating materials distinguished by favorable flameproof properties.

In cases where the expanding agent capable of volatilization or gas formation at a predetermined temperature, for example a (halogenated) hydrocarbon, is simultaneously added to a mixture of aqueous silicate solutions optionally containing inorganic or organic additives, and of the hardeners at this temperature, the initially liquid mixture formed can be used not only for producing uniform foams or other foams containing foamed or unfoamed fillers, predetermined webs, woven fabrics, lattices, structural elements or other permeable structures of foamed or unfoamed material but it can also be foamed through with the mixture to form composite foams with special properties, for example favorable flameproof properties, which may optionally be directly used as structural elements in building, furniture, motor vehicle and aircraft construction.

The foams obtained by the process according to the invention can be added to soil in the form of crumbs, optionally enriched with fertilizers and plant protection agents, in order to improve its agrarian consistency. Foams of high water content can be used as substrates for propagating seedlings, cuttings, plants or cut flowers. By spraying the mixtures on to impassable or loose ground, for example dunes or marshes, it is possible to establish an effectively consolidated surface which soon becomes passable and prevents erosion.

An interesting factor is that, in the event of fire or accident, the proposed reaction mixtures can be sprayed on to an object to be protected, in which case the water present cannot run off or prematurely evaporate on the surface of this object so that particularly effective protection against fire, heat or radiation is obtained because the hardened mixture, providing it still contains water, cannot be heated appreciably beyond 100°C and absorbs IR- or nuclear radiation.

By virtue of their sprayability, the mixtures can form effective protective walls and protective layers in mining in the event of disasters or even for routine work, for example by being sprayed on to woven fabrics, other surfaces, lattices or even only on to walls. In this case, it is of particular importance that hardening can be obtained after only a short time.

Similarly, the foaming mixtures according to the invention can be used in building construction, construction engineering and road building, for erecting walls, igloos, sealing surfaces, for filling joints, for plastering, priming, insulation, decoration and as a covering, screen and coating material. They can also be used as adhesives or mortars or as casting compositions, optionally filled with inorganic or organic fillers.

Since, after drying, the hardened foams obtained by the process according to the invention can show considerable porosity and are able to absorb water, they are suitable for use as drying agents. However, they can also be charged with active subtances or used as catalyst supports, filters or adsorbents.

Auxiliaries optionally present in or subsequently introduced into the reaction mixture, such as emulsifiers, polymer solutions, plastics emulsions, wash-active substances, dispersants, wetting agents, odorants or substances with a hydrophobizing effect, enable the properties of the foams either in their moist or in their dry form to be adjusted as required.

On the other hand, the foams, in their moist, dry or impregnated form, can be subsequently lacquered, metallized, coated, laminated, galvanized, subjected to vapor deposition, bonded or flocked. The moldings can be further processed in their moist or dry form, for example by sawing, milling, drilling, planing, polishing and other machining operations.

The optionally filled moldings can be further modified in their properties by aftertreatment under heat, oxidation processes, hot-pressing, sintering processes or surface melting or other consolidation processes.

Suitable mold materials include inorganic or organic foamed or unfoamed materials such as metals, for example iron, nickel, refined steel, lacquered or, for example, Teflon-coated aluminum, porcelain, glass, gypsum, cement, wood, plastics such as PVC, polyethylene, polyurethane, ABS, polycarbonate etc., also cardboard or paper.

The foams obtained by the process according to the invention can be surface-dried or, where they are in the form of substantially permeable structures, for example higher grade open cell foams or porous materials, they can be dried by centrifuging, vacuum treatment, blowing with air or rinsing with optionally heated liquids or gases which remove the water present, such as methanol, ethanol, acetone, dioxane, benzene, chloroform, etc., or air, $CO_2$ and superheated steam. Similarly, the moist or dry moldings can also be aftertreated by rinsing or impregnation with aqueous or non-aqueous acid, neutral or basic liquids or gases, for example hydrocloric acid, phosphoric acid, formic acid, acetic acid, ammonia, amines, organic or inorganic salt solutions, lacquer solutions, solutions of unpolymerized or already polymerized monomers, polymer latices, dye solutions, galvanizing baths, solutions of catalysts or preliminary catalyst stages, odorants, etc.

The preceding description, without in any way being complete, is intended to illustrate the general potential applications of the process according to the invention for producting moldings, i.e. their potential applications generally determined by the production process itself.

The process according to the invention is illustrated by the following Examples in which parts are parts by weight unless otherwise stated.

EXAMPLE 1

Determination of the gelling time produced by the various hardeners or hardener mixtures, is described by way of example in the following with reference to some prototypes: all the substances and apparatus were tempered to 25°C. 100 g of soda waterglass solution (density 1.36, $Na_2O$-content approximately 8.6 percent by weight, $SiO_2$-content approximately 25.4 percent by weight), in which 0.5 percent by weight of sodium $C_{14}$-alkyl sulfonate had previously been dissolved, were then introduced into a 5 cm diameter beaker equipped with a stirring mechanism. An L-shaped glass rod extends to the middle of the solution, the distance of the bent arm from the wall being about 5 mm. The glass rod is rotated at 250 rpm and acts as a stirrer, the beaker being stationary. The hardener substance is then introduced into the stirred waterglass solution and the time which elapses from this moment until the initially readily stirrable mixture solidifies, was measured. This time is designated the gelling time.

The following gelling times were measured by way of example on the following substances active as hardeners:

| Hardener: | Mins. | Secs. | Hardener No. |
| --- | --- | --- | --- |
| butyric acid chloride |  | 7 | 1 |
| tetrapropenyl succinic acid anhydride |  | 21 | 2 |
| hexahydrophthalic acid anhydride |  | 30 | 3 |
| chloroformic acid butyl ester |  | 48 | 4 |
| chloroformic acid iso octyl ester | 1 | 18 | 5 |
| oleic acid chloride | 1 | 31 | 6 |
| benzoyl chloride | 2 | 1 | 7 |

—Continued

| Hardener: | Mins. | Secs. | Hardener No. |
|---|---|---|---|
| 2-(methoxyethoxy)-4,6-dichloro-s-triazine | 2 | 21 | 8 |
| 3-methyl benzoyl chloride | 3 | 17 | 9 |
| oleic acid-acetic acid anhydride | 4 | 26 | 10 |
| chloroformic acid phenyl ester | 4 | 27 | 11 |
| 2-chlorobenzoyl chloride | 6 | 24 | 12 |
| tolylene diisocyanate | 9 | 30 | 13 |
| benzene sulfonic acid chloride | 10 | 19 | 14 |
| hexamethylene diisocyanate | 12 | 57 | 15 |
| dimethyl sulfate | 13 | 55 | 16 |
| phthalyl chloride, sym. | 4 | 12 | 17 |
| isophthalic chloride | 3 | 28 | 18 |
| chloroformic acid cresyl ester | 3 | 30 | 19 |
| 5-chloroisophthalyl chloride | 10 | 10 | 20 |
| diphenol methane dichloroformate | 2 | 50 | 21 |

Although the first of each pair of substances listed below generally have what is by definition too slow a gelling effect on their own, they can be constituents of a mixture which produces the requisite gelling time through a suitable content of quick-acting hardener. Types of these mixtures are mentioned by way of example; it is quite possible in this connection additionally to use gelling substances which are not claimed within the scope of the process according to the invention providing the necessary gelling times are obtained.

| | Ratio by weight | Mins. | Secs. |
|---|---|---|---|
| o-toluene sulfonic acid chloride/benzoyl chloride | 2 : 1 | 4 | 19 |
| 2-isopropyl-4,6-dichloro-s-triazine/chloroacetic acid ethyl ester | 1 : 1 | 5 | 54 |
| 3,4-dichlorobenzoyl chloride/butyrochloride | 4 : 1 | 6 | 16 |
| phthalyl chloride/benzoyl chloride | 1 : 1 | 1 | 49 |

The numbering of the hardeners in Example 1 is retained for the following Examples.

EXAMPLE 2

The production of foams which can be produced by the hand foaming process under different conditions is described by way of example with reference to hardener 7:

800 parts of 40 percent soda waterglass solution containing 4 parts of sodium $C_{14}$-alkyl sulfonate in solution, were heated to 45°C and poured into an open beaker equipped with a stirring mechanism. 90 parts of benzoyl chloride in admixture with 65 parts of trichlorofluoromethane were then added all at once while stirring with a propeller stirrer. Despite the increased temperature, the mixture could be effectively stirred for a few seconds before it begins to rise in the beaker. The foaming mixture was then immediately poured into a box mold of paper in which the mixture immediately began to rise, the rising process continuing at a greater rate after a few seconds because the reaction of hardener 7 produced a further increase in temperature. After about 4 minutes, the foam had solidified in the box mold and could then be removed from the paper. Through continued reaction, some of the water present in the foam (approximately 140 parts) was automatically forced out of the foam. The finished, moist foam could then readily be cut into any shape. It had a density of approximately 0.3 and was uniformly fine-pored. It dried very quickly on standing in moved air or in a recirculating air cabinet, after which it had a density of about 0.06. Foams of this kind can be used as an insulating material.

EXAMPLE 3

The procedure was as described in Example 2 except that a 30 percent waterglass solution was used. There were no differences in the pattern of the foaming process. The foam formed had a density of 0.045 when dry.

EXAMPLE 4

The procedure was as in Example 2 except that a 20 percent soda waterglass solution was used instead of a 40 percent soda waterglass solution; in addition only 30 parts of trichlorofluoromethane were used. The foam formed had a density of 0.09 after drying.

EXAMPLE 5

The procedure was as in Example 2, except that 150 parts of hardener 7 were used. In this case, the mixture had to be stirred as quickly and as briefly as possible to prevent it from hardening before it had foamed to an adequate extent. After about 5 seconds' mixing the mixture was poured into the mold and a foam was obtained which had a density of about 0.3 when moist. The foam was removed from the mold immediately after hardening, i.e. after about 2 to 3 minutes, and exuded about 200 parts of water which naturally reduces the cost of the subsequent drying process.

EXAMPLE 6

The procedure was as in Example 2, except that the temperature was 30°C rather than 45°C. The foam did not rise as much as in Example 2, its density being around 0.15 after drying.

EXAMPLE 7

The procedure was as in Example 2, except that the temperature was approximately 25°C. The foam formed had a density of about 0.28 after drying.

EXAMPLE 8

The procedure was as in Example 2, except that only 40 parts of hardener 7 were used. The foam formed had a density of 0.07 when dry.

EXAMPLE 9

The procedure was as in Example 2, except that only 10 parts of trichlorofluoromethane were used. The foam formed had a density of approximately 0.55 when dry.

EXAMPLE 10

The procedure was as in Example 2, except that instead of the sodium $C_{14}$-alkyl sulfonate 20 parts of an addition product of 10 moles of ethylene oxide with isooctyl phenol were added to the silicate solution. The dried foam had a density of approximately 0.08.

EXAMPLE 11

The procedure was as in Example 2, except that 200 parts of chalk powder were additionally stirred into the soda waterglass solution. The foam formed had a density of about 0.1 after drying. Talcum powder, quartz powder, short glass fibers, silicon powder or kaolin, could also be used instead of the chalk.

After stirring, the mixtures formed in Examples 2 to 11 were introduced into a mold containing expanded clay particles, fibers or styrene foam particles. Since the freshly prepared mixture was still very thinly liquid, it penetrated the mold filling and wetted the particles introduced. During foaming the foam particles, fibers or other solids present in the mold were distributed in the foam formed, resulting in the formation of a composite foam material.

It was also possible to introduce the freshly prepared mixture before foaming into a closed mold which, basically, is too small for the volume of the foam formed and in which the mixture subsequently foamed and under pressure fills and reproduces all the elements of the mold. It is possible in this way to form foam articles with a substantially closed surface layer, the unit weight of the foam articles formed in this case being governed by the level to which the mold is filled with freshly prepared reaction mixture.

In principle, Examples 2 to 11 can also be similarly carried out with the other hardeners 1 to 20. Other expanding agents can also be used. However, there are of course limits to working by hand in open vessels in the case of low-boiling expanding agents and quick-reacting hardeners. If it is desired to weaken an excessively active hardener, it is advisable, in addition to reducing the reaction temperature, to dilute the hardener for example with one of the described diluents.

EXAMPLE 12

The procedure was as in Example 2, except that a mixture of chloroformic acid ethyl ester (not mentioned in Example 1) and chloroform in a ratio by weight of 30 : 60 was used instead of hardener 7. After drying, the foam formed had a density of approximately 0.15.

The foams according to the invention can be produced more easily in a continuous-operation machine:

This machine continuously mixes a measured flow of silicate solution (optionally containing inorganic or organic additives) with other measured components, for example hardeners, expanding agents, diluents, and discharges the mixture prepared at the particular temperature required. The mixture may optionally be introduced into molds or applied to belts or even sprayed. There are no restrictions to the design of mixing machines such as these which are well known in principle from polyurethane foam technology.

A mixing machine consisting of an approximately 40 ml capacity mixing chamber containing a propeller rotating at around 1,000 rpm, was used in the following Examples. The optionally preheated silicate solution was introduced at the head of the mixing chamber, the hardener, expanding agent and diluent, where used, being introduced through a separate feed pipe. The mixture of the reaction components was delivered under forced flow through the mixing chamber provided with a temperature gauge and was discharged in homogenized form through a nozzle. This nozzle consisted of an outlet pipe the length of which could be varied as required. The discharging mixture could be introduced into molds or applied to moving belts in or on which the foaming process takes place. The foams produced on a moving belt were cut in such a way that rectangular panels were formed. These panels were dried in a recirculating-air dryer or even in a high frequency oven, after which they were again cut in cutting machines and used to determine density. The panels obtained can be used as insulating materials of high heat stability and favorable flameproof properties. If the organic substance is largely removed from the still moist foams by extraction with water or acids, for example HCl, or by treatment with suitable solvents, completely noninflammable insulating materials are obtained after drying. The organic substance can also be removed from the foams by aftertreatment under heat, by distillation, sublimation or oxidation, again leaving the foams completely non-inflammable.

Foams which can be produced in the machine described are described by way of example in the following Table in the form of composition data:

EXAMPLE 13

In all the tests summarized in the following Table, a 38 percent filler-free soda waterglass solution containing 0.5 percent by weight of Na-$C_{14}$-alkyl sulfonate, was introduced at a rate of 1,600 parts per minute.

| Hardener No./parts/min. | Diluent Name/parts/min. | Expanding agent Name/parts/min. | Mixing °C | Dry foam g/cc |
| --- | --- | --- | --- | --- |
| 4/100 | | A/60 | 18 | 0.09 |
| 2/50, 3/100 | H/200 | A/80 | 25 | 0.1 |
| 1/20, 20/50 | K/70 | B/100 | 15 | 0.11 |
| 4/10, 5/90 | I/200 | B/100 | 15 | 0.08 |
| 6/50, 8/100 | | B/50 | 30 | 0.17 |
| 18/100, 9/20 | | D/50 | 50 | 0.1 |
| 19/120 | | C/30 | 35 | 0.08 |
| 16/60 | K/100 | D/40 | 55 | 0.1 |

—Continued

| Hardener No./parts/min. | Diluent Name/parts/min. | Expanding agent Name/parts/min. | Mixing °C | Dry foam g/cc |
|---|---|---|---|---|
| 17/70 | | C/60 | 30 | 0.06 |
| 11/80 | | D/80 | 40 | 0.05 |
| 11/120 | | C/20, D/80 | 30 | 0.04 |
| 9/80, 13/30 | | D/50 | 50 | 0.09 |
| 11/40 | | D/20 | 45 | 0.2 |
| 1/8, 17/40 | | A/50 | 10 | 0.1 |
| 16/40, 3/15 | | C/50 | 18 | 0.09 |
| 16/80 | | C/50 | 27 | 0.11 |
| 14/130 | | D/60 | 50 | 0.1 |
| 14/120, P/12 | | D/20 | 45 | 0.2 |
| 14/120, R/30 | | D/80 | 45 | 0.05 |
| 12/100, Q/20 | | D/60 | 45 | 0.08 |

| Hardener No./parts/min. | Expanding agent Name/parts/min. | Mixing °C | Dry foam g/cc |
|---|---|---|---|
| 9/80, 7/40, 3/20 | C/20, D/60 | 40 | 0.05 |
| 7/190 | D/60 | 45 | 0.05 |
| 7/190 | D/40 | 45 | 0.09 |
| 7/190 | D/20 | 45 | 0.13 |
| 7/190 | D/10 | 45 | 0.26 |
| 7/190 | D/5 | 45 | 0.55 |
| 7/300 | D/60 | 40 | 0.18 |
| 7/150 | D/60 | 40 | 0.09 |
| 7/75 | D/60 | 40 | 0.07 |
| 7/35 | D/60 | 40 | 0.06 |

The following abbreviations were additionally used for the hardeners, diluents and expanding agents in the Table of Example 13:
Additional gelling substances:
P = diethyl oxalate
Q = ethyl formate
R = pyrocarbonic acid diethyl ester
Diluent:
H = chloroform
I = petroleum ether (b.p. above 40°C)
K = trichlorethylene
Expanding agents:
A = vinylchloride
B = butane
C = dichlororodifluoromethane
D = trichlorofluoromethane

EXAMPLE 14

The procedure was as in Example 13. 1600 parts of the soda waterglass solution containing Na–C$_{14}$–alkyl sulfonate according to Example 13 (preheated to 45°C), 160 parts of hardener 9 and 60 parts of expanding agent D per minute were passed through the mixing machine. The discharging mixture was sprayed under its own pressure on to a slowly rotating, inflated half-shell of rubber cloth. The mixture foamed and hardened in this half-shell. It is possible in this way to build up an igloo or a hollow body of any wall thickness. It is best to adjust a wall thickness of approximately 40 cm. After about 60 minutes, the odor of benzoyl chloride had almost completely disappeared. After 3 hours, a door opening is cut into the half-shell and the rubber skin removed after ventilation through the opening. A self-supporting foam igloo was obtained which dried after a few days of dry weather and which can be protected against weather, for example by means of a paint. The igloo thus produced was non-inflammable.

EXAMPLE 15

The procedure was as in Example 2, except that 150 parts of hardener 16 and 85 parts of trichlorofluoromethane were used instead of hardener 7. The foam formed hardened much more slowly and had somewhat coarser pores. After about 10 minutes, the foam could be released from its mold. The dried foam had a density of about 0.08.

EXAMPLE 16

The procedure was as in Example 2, except that 60 parts of hardener 17 were used for hardening. A quickly expanding, fine-pored foam was obtained with a dry density of about 0.04. If only half the quantity of trichlorofluoromethane is used in this test, the fine-pored foam formed has a dry density of 0.09. By virtue of its low vapor pressure, phthalyl chloride (hardener 17) is eminently suitable for the production of foams in accordance with the invention, as is trimellitic acid trichloride.

EXAMPLE 17

800 parts of an approximately 38 percent soda waterglass solution containing 1 percent by weight of sodium alkyl sulfonate were thoroughly stirred with a mixture of 65 parts of trichlorofluoromethane, 20 parts of benzoyl chloride and 100 parts of 3,4-dichlorobenzene sulfonic acid chloride. The mixture was poured into a box mold in which it expanded to about twice its original volume. The soft foam formed was then introduced into a heating cabinet heated to around 120°C in which it expanded to about four times its original volume and at the same time hardened.

EXAMPLE 18

800 parts of the waterglass solution used in Example 1 were heated to 45°C and quickly stirred with a solution of 50 parts of chloroformic acid ethyl ester in 50 parts of trichlorofluoromethane. Chloroformic acid ethyl ester produced hardening within 50 seconds under the conditions of Example 1. The thinly liquid foamy reaction mixture was poured into a box mold in which it foamed and hardened. The foam formed had a density of 0.11 when dry.

The following chloroformic esters were used in the following Examples:

| | Hardener | Acid equivalents per mole | Approximate equivalent weight |
|---|---|---|---|
| A A | bis-chloroformic acid ester of diethylene glycol (96 %) | 6/231 | 38 |
| B B | dipropylene glycol (93 %) *) | 6/259 | 43 |
| C C | ethylene propylene glycol (90 %) **) | 6/245 | 41 |
| D D | triethylene glycol (99 %) | 6/275 | 46 |
| E E | tripropylene glycol (91 %) | 6/303 | 50 |
| F F | ethylene dipropylene glycol (90 %) ***) | 6/289 | 48 |
| G G | bis-hydroxy ethyl maleate (95 %) | 8/329 | 41 |
| H H | tetraethylene glycol (98 %) | 6/319 | 53 |
| I I | trichloroformic acid ester of the addition product of 4 moles of ethylene oxide with glycerin (76 %) | 9/455 | 51 |
| K K | hexachloroformic acid ester of the addition product of 8 moles of ethylene oxide with sorbitol (71 %) | 18/906 | 50 |
| L L | chloroformic acid ester of glycol monotrichloroacetate | 4/270 | 68 |

\*) commercial mixture:
50 % of 2-hydroxy-1-propyl-(1-hydroxy-2-propyl)-ether
40 % of bis-(2-hydroxypropyl)-ether
10 % of bis-(1-hydroxy-2-propyl)-ether
\*\*) commercial addition product of 1 mole of propylene oxide with 1 mole of ethylene glycol,
\*\*\*) commercial addition product of 2 moles of propylene oxide and 1 mole of ethylene glycol.

The percentages following the names relate to the active chlorine content measured by titration with butylamine in accordance with the following procedure and are based on the theoretically expected values. The equivalent weight is calculated from the theoretical molecular weight of the compound, divided by the number of acid equivalents theoretically liberated per mole.

Titration procedure:

Approximately 0.5 to 1.0 g of chloroformic acid ester was reacted with n/10 – n/5 di-n-butylamine in distilled acetone or chlorobenzene and the excess base back titrated with n/10 hydrochloric acid against bromophenol blue, two equivalents of di-n-butylamine corresponding to one equivalent of active chlorine.

Hand foaming tests carried out in batches with the various types of hardeners were described in the following table.

The procedure adopted was as follows:

The silicate solution was heated to the reaction temperature specified. The specified quantity of silicate solution was then introduced into a beaker equipped with a stirring mechanism, followed by addition both of the hardener and of the expanding agent while stirring intensively with a propeller stirrer. The mixture expands vigorously, although it can still be effectively stirred despite a certain loss of expanding agent. As soon as the mixture begins to rise uniformly in the beaker (after stirring for a few seconds), the thoroughly mixed, creamy mass was poured into a box mold of paper. The mixture continued to expand in this box mold and formed a uniform, fine-pored block of foam which, although initially soft, hardened after a few minutes to such an extent that the paper could be removed. A slab is then cut from this block and dried at room temperature in a recirculating air dryer. The specific gravity of the slab thus dried was then determined at constant weight. The slabs had an edge length of about 10 cm.

Unless otherwise stated, all the silicate solutions used contain 0.5 percent by weight of Na-alkyl sulfonate (Mersolat$^R$) as foaming and emulsifying auxiliary. This applies to all the Examples.

| Example No. | | 19 | 20 | 21 | 22 | 23 |
|---|---|---|---|---|---|---|
| approximately 48 % Na-silicate solution | parts | 300 | | | | |
| approximately 38 % Na-silicate solution*' | do. | | 380 | 380 | 380 | 380 |
| H₂O | do. | | 100 | 200 | | |
| temperature | °C | 45 | 40 | 45 | 42 | 40 |
| trichlorofluoromethane | parts | 30 | 30 | 20 | 30 | 30 |
| methylene chloride | do. | | | | | |
| petroleum ether b.p. 40–70°C | do. | | | | | |
| Hardener A A | do. | 30 | 38 | 58 | | |
| B B | do. | | | | 25 | 35 |
| C C | do. | | | | | |
| D D | do. | | | | | |
| E E | do. | | | | | |
| F F | do. | | | | | |
| G G | do. | | | | | |
| H H | do. | | | | | |
| I I | do. | | | | | |
| K K | do. | | | | | |
| L L | do. | | | | | |
| specific gravity dry | g/cc | 0.09 | 0.05 | 0.07 | 0.07 | 0.07 |

*' 380 parts of the approximately 38 % sodium silicate solution require 1 mole of HCl (titrimetric) for neutralization.

The various hardeners were used in the form of crude products with the purity specified in the quantities specified. This procedure is adopted in all the Examples.

| Example No. | | 24 | 25 | 26 | 27 | 28 |
|---|---|---|---|---|---|---|
| approximately 48 % Na-silicate solution: | parts | 300 | | | | |
| approximately 38 % Na-silicate solution*' | do. | | 380 | 380 | 380 | 380 |
| H₂O | do. | 200 | 100 | 200 | | |
| temperature | °C | 43 | 43 | 45 | 37 | 37 |
| trichlorofluoromethane | parts | 30 | 30 | 30 | 10 | 40 |
| methylene chloride | do. | | | | | |
| petroleum ether b.p. 40–70°C | do. | | | | | |
| Hardener A A | do. | | | | | |
| B B | do. | 43 | 53 | | | |
| C C | do. | | | 60 | | |
| D D | do. | | | | 34 | 34 |
| E E | do. | | | | | |
| F F | do. | | | | | |
| G G | do. | | | | | |
| H H | do. | | | | | |
| I I | do. | | | | | |
| K K | do. | | | | | |
| L L | do. | | | | | |
| specific gravity dry | g/cc | 0.06 | 0.05 | 0.04 | 0.22 | 0.05 |

| Example No. | | 29 | 30 | 31 | 32 | 33 |
|---|---|---|---|---|---|---|
| approximately 48 % Na-silicate solution | parts | | | | | |
| approximately 38 % Na-silicate solution*' | do. | 380 | 380 | 380 | 380 | 380 |
| H₂O | do. | 100 | 100 | | | |
| temperature | °C | 48 | 48 | 40 | 40 | 40 |
| trichlorofluoromethane | parts | | | 30 | 30 | 30 |
| methylene chloride | do. | 35 | | | | |
| petroleum ether b.p. 40–70°C | do. | | 35 | | | |
| Hardener A A | do. | | | | | |
| B B | do. | | | | | |
| C C | do. | | | | | |
| D D | do. | 34 | 34 | | | |
| E E | do. | | | 45 | | |
| F F | do. | | | | 40 | |
| G G | do. | | | | | 37 |
| H H | do. | | | | | |
| I I | do. | | | | | |
| K K | do. | | | | | |
| L L | do. | | | | | |
| specific gravity dry | g/cc | 0.18 | 0.13 | 0.06 | 0.09 | 0.07 |

| Example No. | | 34 | 35 | 36 | 37 |
|---|---|---|---|---|---|
| approximately 48 % Na-silicate solution | parts | | | | |
| approximately 38% Na-silicate solution*' | do. | 380 | 380 | 380 | 380 |
| H₂O | do. | | | | |
| temperature | °C | 40 | 40 | 40 | 40 |
| trichlorofluoromethane | parts | 30 | 30 | 30 | 30 |
| methylene chloride | do. | | | | |
| petroleum ether b.p. 40–70°C | do. | | | | |

—Continued

| Example No. | | 34 | 35 | 36 | 37 |
|---|---|---|---|---|---|
| Hardener A A | parts | | | 19 | |
| B B | do. | | | | 30 |
| C C | do. | | | | |
| D D | do. | | | | |
| E E | do. | | | | |
| F F | do. | | | | |
| G G | do. | | | | |
| H H | do. | | 55 | | |
| I I | do. | | | 25 | |
| K K | do. | | | | 30 |
| L L | do. | | | | |
| specific gravity dry | g/cc | 0.08 | 0.1 | 0.11 | 0.08 |

*) 380 parts of the approximately 38 % sodium silicate solution require 1 mole of HCl (titrimetric) for neutralization.

EXAMPLE 38

The procedure was as described in Example 23, except that a silicate solution was used which, instead of the alkyl sulfonate, contained 1 percent by weight of an addition product of 14 moles of ethylene oxide with oleyl alcohol as emulsifier. A foam with a specific gravity of 0.09 was formed in the same way, but had somewhat coarser pores than the foam of Example 23. In the absence of an emulsifier, a coarse-pored foam with a specific gravity of 0.11 was formed.

EXAMPLE 39

The procedure was as in Example 23, except that a silicate solution containing 3 percent by weight of the alkyl sulfonate in solution was used. A comparable foam block was obtained, although it hardened much more quickly.

EXAMPLE 40

The procedure was as in Example 23, except that an approximately 40 percent by weight potash waterglass solution was used. The similarly obtained foam block had a specific gravity of 0.09 after drying.

EXAMPLE 41

380 parts of the silicate solution was in Example 23 were stirred at 40°C with 30 parts of fluorotrichloromethane, 20 parts of hardener B B and 30 parts of 1,4-butane diol dichloroformic acid ester, and the resulting mixture converted into a foam block in the same way as described in Example 20. A foam was similarly formed, but hardens much more slowly than the form according to Example 20 because the 20 parts of hardener B B are not sufficient for complete hardening and because the additionally used hardener (butane diol-dichloroformic acid ester) reacted much more slowly. This effect is even more noticeable where pentaneglycol-dichloroformic acid ester (35 Parts) is used as the additional hardener. The advantage of this procedure is that the heat of reaction was released after some delay, rather than suddenly, so that overheating effects and any splitting of the foam formed were avoided.

Comparable delays were observed in cases where equal parts by weight of isophthalic acid-bis-carbonic acid ethyl semi ester mixed anhydride, di-n-propyl pyrocarbonate or finely powdered cyanuric chloride were used instead of butane diol-dichloroformic acid ester.

EXAMPLE 42

The procedure was as in Example 23, except that 100 parts of $CaCO_3$-powder were previously suspended in the silicate solution. A foam with a specific gravity of 0.15 was obtained. Similar results are obtained with 100 parts of MgO-powder.

EXAMPLE 43

The procedure was as in Example 23, except that 30 parts of glass fibers with an average length of 2 mm were previously suspended in the silicate solution. After drying, the foam formed had a specific gravity of 0.11. Similar results were obtained where short asbestos fibers or cellulose fibers are used.

EXAMPLE 44

The creamy reaction mixture formed in accordance with Example 23 was cast on to a loose glass fiber mat, the mixture impregnated and subsequently foamed through the mat. A fiber-reinforced foam with a unit weight of approximately 0.18 g/cc was obtained.

EXAMPLE 45

The procedure was as in Example 28, except that the silicate solution was diluted with 100 parts of water. After drying, the foam formed was largely open-pored and could be impregnated with a 30 percent polyethyl acrylate latex. After the excess latex had been removed by centrifuging, followed by drying, a foam with a certain degree of elasticity and without any tendency to crumble, was obtained. Comparable modifications of this foam or even of the foams obtainable in accordance with Examples 19 to 37, was obtained with other latices, for example with a latex containing a copolymer of 75 percent by weight of vinyl chloride and 25 percent by weight of ethylene and diluted to a solids content of 30 percent by weight.

Modification was generally sufficient if the latex was sprayed on to the surface of the foam, followed by drying.

EXAMPLES 46 – 51

An approximately 40 ml capacity mixing chamber which was provided with a gate-paddle stirrer rotating at around 2000 rpm and with nozzle inlets for silicate solution, hardener and expanding agent at its upper end and with a product-outlet valve in its base, was used for the continuous production of foams.

The silicate solution was tempered at the indicated temperature, the auxiliaries (hardener and foaming agent) were kept at room temperature, and all were introduced under pressure into the mixing chamber by means of forced-feed pumps. The reaction mixture issued from the base outlet in the form of a creamy mixture and was introduced into molds in which the mixture foamed and hardened.

The parameters of the various Examples are set out in the following table:

| Example No. | | 46 | 47 | 48 | 49 | 50 | 51 |
| --- | --- | --- | --- | --- | --- | --- | --- |
| approximately 38 % Na-silicate solution | parts/mins. | 380 | 380 | 380 | 380 | 380 | 380 |
| temperature | °C | 45 | 15 | 10 | 30 | 40 | 16 |
| Hardener A | parts/mins. | | 10 | | | | 40 |
| B | | | | | 43 | 10 | 45 |
| D | | | 44 | | | 30 | |
| E | | | | 40 | | | |
| trichlorofluoromethane | parts/min. | 20 | | | | 10 | 20 |
| pentane | | | | | 10 | 5 | 10 |
| vinyl chloride | | | | 15 | 10 | | |
| specific gravity of dry foam | g/cc | 0.08 | 0.15 | 0.09 | 0.10 | 0.05 | 0.10 |

If the foaming reaction mixture is allowed to flow on to a moving belt, it is possible to obtain endless lengths of foam.

EXAMPLE 52

The mixing chamber used is the same as that described in Examples 46 – 51, except that only silicate solution and hardener were introduced into it. The issuing reaction mixture was sprayed into a cylindrical vessel in close proximity to its base which is in the form of a frit through which air bubbles. The air entering the reaction mixture through the base converts it into a foam which is removed through an overflow pipe at the head of the cylinder and introduced into molds or discharged on to a belt in which or on which it solidifies. An air-expanded foam is obtained in this way.

The approximately 38 percent silicate solution containing 1 percent of Na-alkyl sulfonate is introduced at a rate of 380 parts per minute and the hardener H H at a rate of 40 parts per minute. The air is introduced in excess, the air which is not trapped in the foam escaping through the overflow of the cylindrical foam generator. The operation is carried out at room temperature. The foam formed has a unit weight of approximately 100 kg/m³ (dry).

50 parts of hardener D or of hardeners E E, F F, G G, H H can also be used with a similar result.

EXAMPLE 53

The procedure was as in Example 52, except that the silicate solution used was stirred beforehand with 190 parts of an approximately 38 percent ethylene (30 percent by weight)-vinyl chloride (70 percent by weight) latex.

The resulting air-expanded foam is not as brittle as the foam obtained in accordance with Example 52, because the foam skeleton was additionally elasticized by the polymer and made less sensitive to breakage.

EXAMPLE 54

The procedure was as in Example 52, except that the hardener was not added to the unfoamed silicate solution, but was stirred into the finished foam. After drying, the foam obtained had a unit weight of approximately 110 kg/m³.

EXAMPLE 55

380 parts of the silicate solution used in Example 23 were heated to 40°C. 30 parts of finely powdered cyanuric chloride were then stirred in, followed immediately by the addition of a solution of 30 parts of hardener DD in 40 parts of trichlorofluoromethane. The mixture which foamed like cream was introduced into a box mold in which it was completely foamed. The cyanuric chloride odor disappeared after about 2 hours. The foam was removed from the mold and dried. At constant weight, it had a specific gravity of about 0.06.

It will be appreciated that the instant specification and examples are set forth by way of illustration and not limitation, and that various modifications and changes may be made without departing from the spirit and scope of the present invention.

What is claimed is:

1. Process for the production of a foam having a silicate skeleton which comprises mixing in aqueous solution a water-soluble silicate, a hardener which liberates acid in water comprising at least one member selected from the group consisting of carboxylic acid anhydrides, carboxylic acid chlorides, chloroformic acid esters and sulfochlorides, and at least one foaming agent selected from the group consisting of alkanes, alkenes, halogen-substituted alkanes, halogen-substituted alkenes and dialkyl ethers, based on the mixture the silicate content being about 5 to 50 percent by weight, the content of the hardener between about 0.01 and 60 percent by weight and the content of the foaming agent between about 0.01 and 50 percent by weight, and bringing the mixture to a temperature above the boiling point of the foaming agent, whereby said mixture foams.

2. Process according to claim 1, wherein said acid-liberating hardener comprises at least one compound of the formula

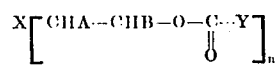

wherein
- Y is a halogen atom,
- A and B are a methyl group, or a hydrogen atom,
- n is an integer between 2 and about 20, and
- X is an oxygen atom or a radical of a polyol having n hydroxy groups or of a polycarboxylic acid hahaving n carboxy groups.

3. Process according to claim 1, wherein said acid-liberating hardener is a substance which, when added in the form of a 10 percent by weight mixture to a soda waterglass solution containing 0.5 percent by weight of Na—$C_{14}$-alkyl sulfonate with a density of 1.36 ($Na_2O$-content approximately 8.6 percent by weight, $SiO_2$-content approximately 25.4 percent by weight), causes this solution to gel in less than 15 minutes at 25°C.

4. Process according to claim 1, wherein said aqueous solution contains up to about 95 percent by weight of at least one inert organic or inorganic filler.

5. Process according to claim 4, wherein said filler comprises at least one member selected from the group consisting of asbestos, sand, magnesium oxide, dolomite, chalk, talcum, kaolin, glass in foamed or fibrous form, carbon, polystyrene, polyvinyl chloride and polyethylene in foamed or unfoamed form, terephthalic acid polyester, polyacrylonitrile, polyamides, polypropylene and polyurethanes.

6. Process according to claim 1, wherein said water-soluble silicate is a sodium waterglass solution,
- said hardener is a chloroformic acid ester and
- said foaming agent is trichlorofluoromethane.

7. Process according to claim 6, wherein the silicate content of the mixture is about 20 to 40 percent by weight, the content of the hardener between about 5 and 20 percent by weight and the content of the foaming agent is about 0.5 to 10 percent by weight.

8. A silicate foam produced by the process of claim 1.

* * * * *